United States Patent [19]
Joray et al.

[11] 3,831,325
[45] Aug. 27, 1974

[54] SHARPENING MECHANISM PARTICULARLY IN COMBINATION WITH A FORAGE CHOPPER OR THE LIKE

[75] Inventors: Marvin L. Joray; Nathan L. Blake, both of Coldwater; Gerald F. Richards, Celina, all of Ohio

[73] Assignee: AVCO Corporation, Coldwater, Ohio

[22] Filed: July 2, 1973

[21] Appl. No.: 376,054

[52] U.S. Cl. ............................................. 51/249
[51] Int. Cl. ....... B24b 19/00, B24b 3/00, B24b 5/18
[58] Field of Search......... 51/247, 33 HK, 34 A, 36, 51/74 BS, 91 BS, 91 HK, 98 BS, 98 HK, 100 R, 104 BS, 218 R, 222, 225, 246; 83/174.1, 174; 56/250; 76/82.1, 86

[56] References Cited
UNITED STATES PATENTS

| | | | |
|---|---|---|---|
| 978,356 | 12/1910 | Chaille | 76/82.1 |
| 1,263,666 | 4/1918 | Hastings | 76/82.1 |
| 2,141,359 | 12/1938 | McKittrick | 76/82.1 |
| 3,600,859 | 8/1971 | Edgecomb | 51/56 |
| 3,724,139 | 4/1973 | Leverenz | 51/249 |
| 3,726,047 | 4/1973 | Long | 51/249 |

*Primary Examiner*—Othell M. Simpson
*Attorney, Agent, or Firm*—Charles M. Hogan; Gary M. Gron

[57] ABSTRACT

A forage chopper, including a rotary cutter, is provided with a mechanism for sharpening the knives of the cutter. A grinding stone is mounted on a slide which is guided by a helical bar. The helical knives of the cutter are successively locked in a sharpening position in which the grinding stone uniformly removes material from bevel surfaces thereof as the slide is traversed along the helical guide bar to sharpen their helical cutting edges. The grinding stone may be adjusted to vary the amount of material removed from the bevel surfaces of the knives and the guide bar has an extension on which the grinding stone slide is locked in a storage position during normal operation of the forage chopper. A motor spring is connected to the slide to assist an operator in moving the slide along the guide bar.

16 Claims, 7 Drawing Figures

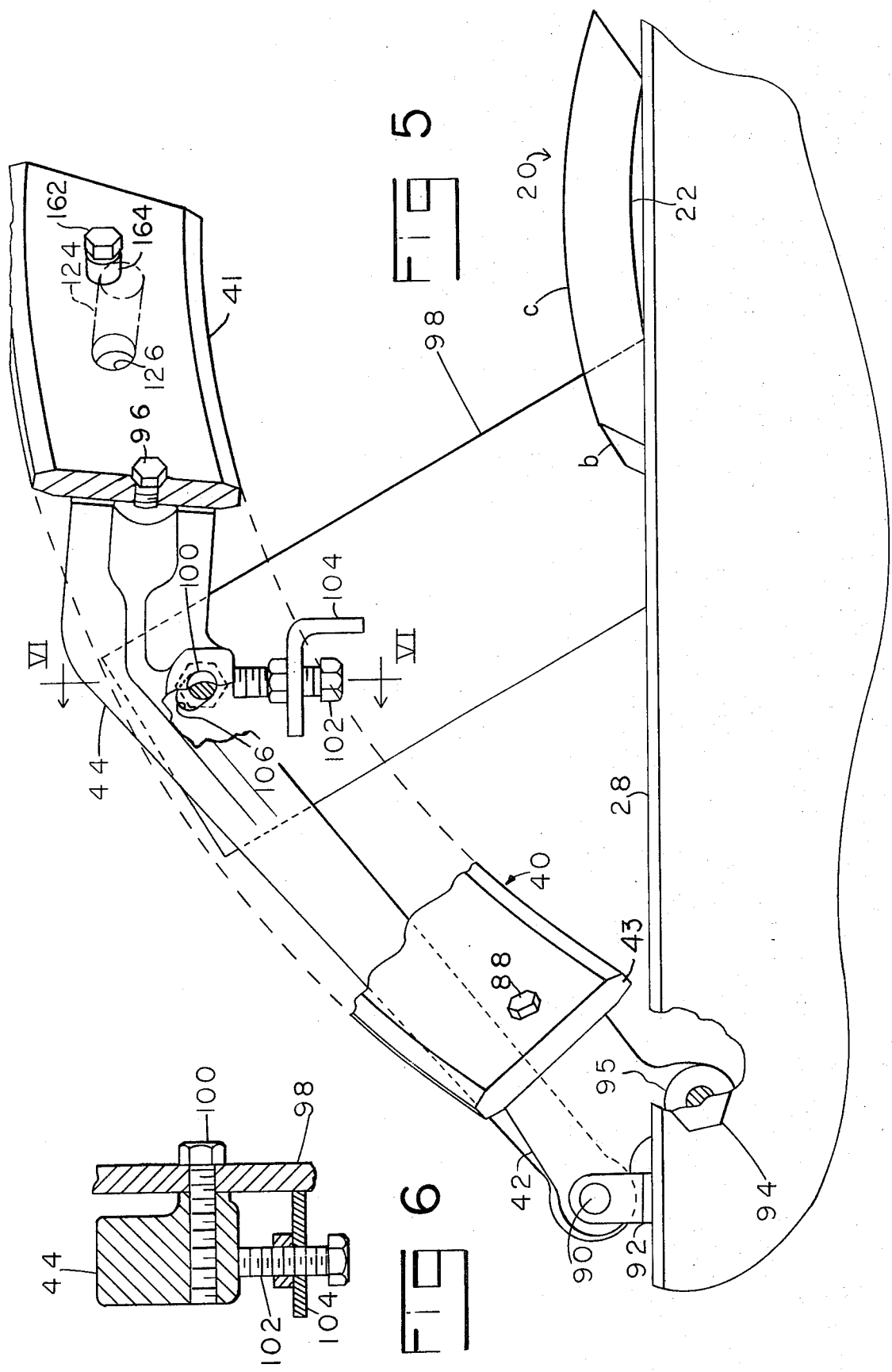

SHARPENING MECHANISM PARTICULARLY IN COMBINATION WITH A FORAGE CHOPPER OR THE LIKE

The present invention relates to improvements in sharpening mechanisms and improved combinations of sharpening mechanisms and forage choppers or the like.

The present invention in its broader aspects has utility in the sharpening of helical, rotating knives as are employed in various cutting or shearing operations. However, the invention is primarily motivated by the needs and requirements of forage choppers used in the agricultural industry.

Such forage choppers employ a rotor on which are mounted a plurality of knives having helical cutting edges. Forage choppers are generally propelled through a field of corn, alfalfa or other forage or silage material. The forage may have been previously cut or the chopper may have a cutting attachment mounted thereon. In any event, the forage material is usually fed automatically to feed rolls which then direct the forage to the rotating knives which drop or shear it against a shear bar into relatively small lengths. The chopped forage is thus reduced in volume or bulk and then discharged to a wagon or cart trailing behind the chopper.

The chopping or cutting operation is carried out in an essentially hostile environment insofar as the cutting edges of the knives are concerned. Not only are the basic ingredients for corrosion of the steel knives present, but the forage material itself is abrasive and entrained dirt and sand further supply abrasive ingredients which tend to dull the cutting edges of the knives. Dull cutting edges of these knives result in damage to the forage, failure to obtain a clean cut and resultant clogging of the feed mechanism, increased power requirements for the chopper rotor, as well as other disadvantages.

While the knives of most choppers are made of high quality steels or alloys, so that the knife edges have a reasonable operating life, nonetheless, the sharpening of knives is required often enough so that it is impractical to either replace them or remove them from the machine for a factory-type resharpening.

This broad problem has been previously recognized and at least two types of sharpeners have been proposed which enable the knives to be sharpened without their removal from the forage chopper. In one approach a grinding force stone is traversed along the length of the knives as they rotate. While this solution is simple and relatively economical, it does not provide the proper beveled angle for the knife edges. Thus its effectiveness is limited to a relatively few sharpenings before it becomes desirable or necessary to regrind the knives so that their cutting edges have the proper bevel angle.

Another disposal has been to traverse a grinding wheel along the axis of the rotor with the face of a grinding wheel engaging the beveled surface of the knife as the knife edge is sharpened. This proposal is shown in U.S. Pat. No. 3,581,446. While this approach can provide a proper bevel angle for the knife cutting edge, it requires rotation of the knife rotor in order to maintain this bevel angle. There is a resultant lack of stability in the grinding operation as well as a complication of the operating parts that are required for the sharpening operation.

Accordingly, the broad object of the invention is to provide, in combination with a forage chopper or the like, improved sharpening mechanisms for the helical knives employed therein and more specifically, to provide such an improved combination which overcomes the shortcomings of present combinations in maintaining desired bevel surface for the cutting edges of the knives.

Another object of the invention is to provide an improved device for sharpening the helical cutting edges of knives mounted on a rotor.

The above ends may be attained, in accordance with the broader aspects of the invention, by a sharpening device for a knife having a helical cutting edge defined on one side by a sharpenable surface. A sharpening element is engageable with this cutting edge surface when the knife is in a predetermined fixed position. The sharpening element is traversed along the cutting edge surface by means which position it and helically guide it along the length of the knife surface at a constant angular and distance relationship relative thereto once the knife is in its fixed position.

In another aspect of the invention sharpening mechanisms may be combined with a forage chopper or the like and comprise a guide member mounted on the frame means of the forage chopper. A sharpening element is mounted on means which are slidable along the guide member. The forage chopper comprises a rotor having a plurality of knives mounted thereon with each knife having a cutting edge twisted to a given helix angle and bounded by an outwardly facing beveled surface. Means are provided for successively locking each knife in a fixed predetermined sharpening position. The slidable means position the sharpening element for engagement with the beveled surface of a knife in its sharpening position. The sharpening element may thus be translated along the guide member which includes a helical raceway so that material is removed uniformly from the beveled surface of the knife to sharpen its cutting edge.

Advantageously, means are provided for adjusting the sharpening element relative to the slide means in a direction toward and away from the rotor axis in order to control the amount of material removed in the sharpening operation.

Another feature is found in the provision of means for storing the sharpening element in a position clear of and spaced from the knives when the rotor is rotating in normal operation of the forage chopper. Preferably this is accomplished by forming an extension of the guide member on which the sharpening element slide may be locked in a storage position with the sharpening element disposed outwardly from one end of the rotor.

More specific features are found in forming the guide member as a helical bar, the upper and lower surface of which form a raceway. A slide bracket may be mounted on this raceway by rollers on a mounting plate which is adjusted relative to the slide bracket in a direction toward and away from the rotor axis. The sharpening element may preferably be in the form of a grinding head comprising an electrical motor secured to the mounting plate and having a cup-shaped grinding stone attached to the lower end of its output shaft and positioned for engagement of its outer radial surface with the beveled surface of the knife to be sharpened. Further features of the invention are found in the mounting of the guide bar to assure concentricity thereof with the axis of the rotor.

The above and other related objects and features of the invention will be apparent from a reading of the following description of the disclosure found in the accompanying drawings and the novelty thereof pointed out in the appended claims.

In the drawings:

FIG. 3 is a side elevation of a grinding head seen in FIG. 2;

FIG. 4 is a side elevation of the same grinding head;

FIG. 5 is a side elevation particularly illustrating a guide member for the sharpening head;

FIG. 6 is a section taken on line VI—VI in FIG. 5; and

Figure 1:
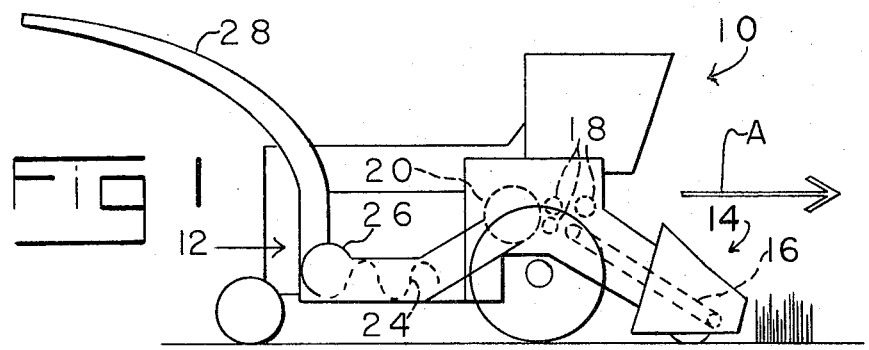
FIG. 1 is a view of a forage chopper, in which the present invention is embodied, mounted on a power unit with which it may be used.

FIG. 1 illustrates a power unit 10 generally in the nature of a tractor on which a forage harvester 12 is mounted. The forage harvester is propelled in the direction of arrow A by the power unit 10 through a field to be harvested. The primary function of a forage chopper is to gather from the field such forage material as straw, alfalfa, corn or the like, reduce its volume by chopping and then discharge it into a trailing cart or wagon. FIG. 1 illustrates a simple windrow pickup 14 for previously cut forage material. The header mechanism for the forage chopper may also include a cutting mechanism or a mechanism for picking corn ears.

Figure 2:
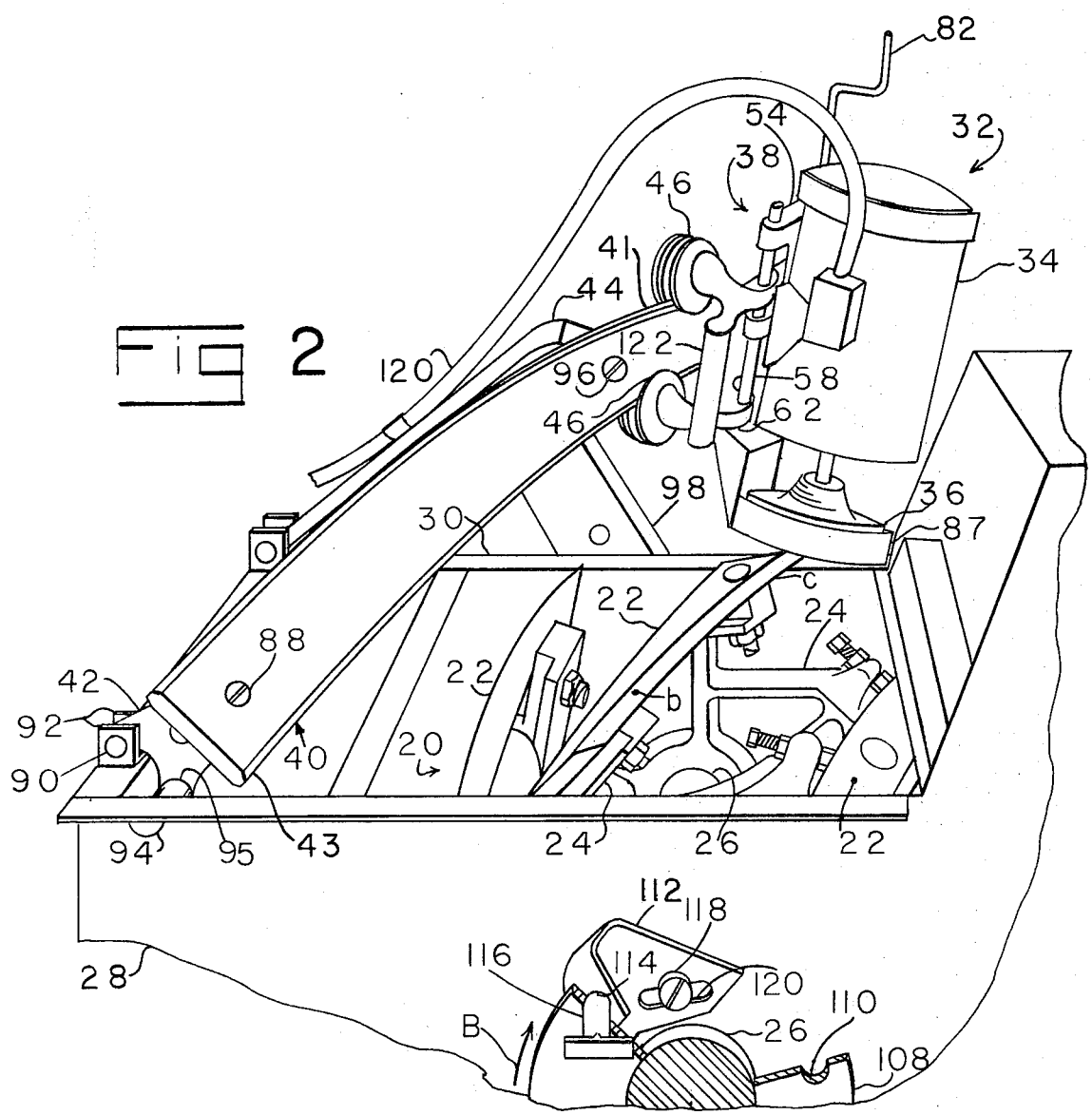
FIG. 2 is a perspective view of the sharpening device and forage chopper combination of the present invention.

The forage material is fed onto a conveyor 16 and then between various feed and compactor rolls 18 to a rotor 20 on which are mounted a plurality of cutting knives 22 (shown in FIG. 2). These cutting knives shear the forage material against a bar (not shown) so that it is reduced in bulk and discharged to an auger 24. The chopper forage is then fed to a blower 26 which discharges it through a spout 28 into a truck or wagon which would normally trail behind and be pulled by the power unit 10.

The general operation of such forage choppers is well known to those skilled in the art and further description is unnecessary for an understanding of the present invention, although some further reference thereto will be made hereinafter.

Referencing next FIG. 2, the forage chopper rotor 20 is shown in greater detail. This rotor comprises a plurality of equi-angularly spaced knives 22 which are removably secured at their opposite ends to frames 24 by the illustrated screws which also provide for their adjustment. The frames 24 in turn are secured to a shaft 26. The shaft 26 and the rotor 20 are driven from the power unit 10, rotating in the direction of arrow B in the normal operation of the forage chopper. The forage chopper also comprises frame means which includes sheet metal frames 28 and 30 at opposite ends of the rotor 20 on which the shaft 26 is journaled.

The knives 22 are helically formed concentrically of the shaft 26 and have helical cutting edges $c$ at their leading edges which are defined by outer beveled surface $b$. In normal operation the rotor or cutting reel 20 rotates so that the cutting edges $c$ of successive knives progressively shear forage material against a shear bar (not shown) adjacent the above referenced feed rolls. Due to the adhesive nature of the forage material, as well as the abrasiveness of sand and dirt entrained therein, the cutting edges $c$ require resharpening at fairly frequent intervals. The present sharpening mechanism, provided in combination with the forage chopper, provides a quick and convenient method for sharpening these cutting edges by grinding the surfaces $b$ at the proper bevel angle, as will now be described.

A sharpening element in the form of a grinding head 32 is disposed above the rotor 20 and comprises an electrical motor 34 having a grinding stone 36 secured at the lower end of its output shaft. It should be apparent, however, that other devices for driving the grinding stone may be used, such as a gasoline engine, hydraulic motor, etc. The grinding head is mounted on a slide 38 which is positioned by a guide member in the form of a helical bar 40. The bar 40 is mounted by support arms 42 and 44, respectively, on the forage chopper frame in a manner later described in greater detail. The slide 38 includes grooved rolls 46 which engage and are positioned by the upper and lower raceway forming surfaces of the guide bar 40. When a knife 22 is positioned as illustrated in FIG. 2, the slide 38 may be drawn along the guide bar 40 to sharpen that knife. The construction of the slide 38 and the helix of the guide bar 40 is such that the outer radial face of the grinding stone 36 will remove a uniform amount of material from the beveled surface $b$ to sharpen the edge $c$.

Figures 3, 4:
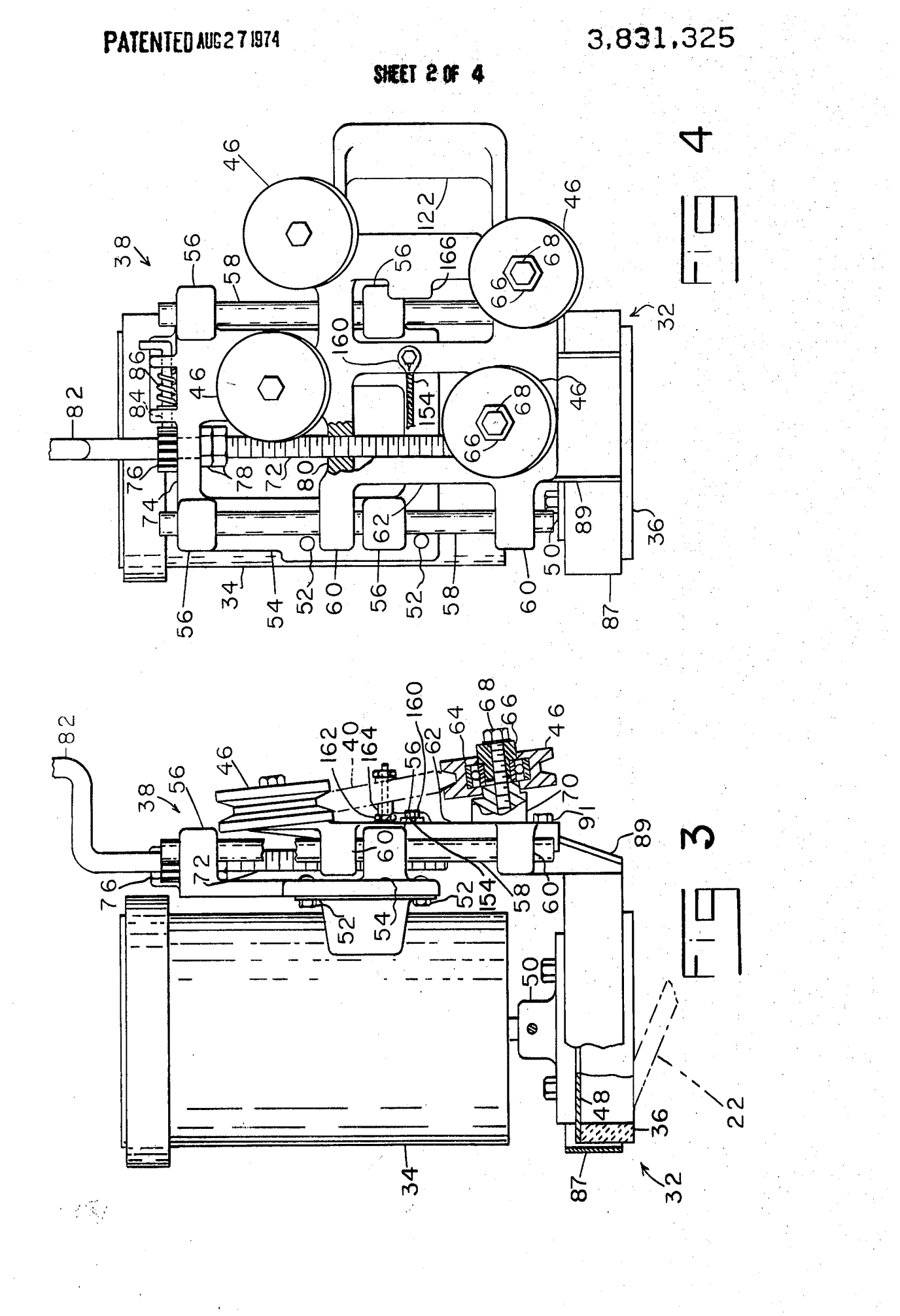

A better understanding of the grinding head 32 and slide 38 will be had by reference to FIGS. 3 and 4. The grinding stone 36 may be in the form of a composite cup-shaped wheel, including the grinding stone and a steel plate 48 to which it is bonded. This composite element may be secured to a grinding wheel holder 50 which is in turn secured to the output shaft of the motor 34. The motor 34 is secured by screws 52 to a mounting plate 54. The mounting plate 54 includes ears 56 which are slidable on a pair of posts 58. The posts 58 are positioned by lugs 60 formed integrally with a slide bracket 62. The previously referenced grooved rolls 46 are rotatably mounted on the slide bracket 62 preferably by ball bearings 64, one being shown in FIG. 3. The marginal edge portions of the guide bar 40 are preferably beveled and the wheels are grooved on similar bevel angles to provide for a snug fit with the wheels 46. The snugness of this fit may be adjusted and maintained through the provision of eccentrics 66 in mounting the lower pair of guide wheels 46. More specifically, a bolt 68 passes through the eccentric 66 and is threaded into a boss 70 integral with the slide bracket 62. The outer surface of the eccentric 66 is eccentric to the bolt hole and is received by the inner race of the ball bearing 64. The screws 68 may be loosened, permitting the rotation of the eccentrics 66 to bring the lower wheels 46 toward and away from the opposed upper wheels 46 to provide the desired snugness in gripping the guide bar 40. This enables the grinding wheel head 32 to be rigidly positioned relative to the knife that is being sharpened.

The mounting plate 54 is adjustably positioned relative to the slide bracket 62 by a jack screw 72. The jack screw 72 is held in an axially fixed position relative to a web 74 of the mounting plate 54 by a cog 76 on one side thereof and a nut and locking nut 78 on the opposite side thereof. The jack screw 72 is then threaded into a web 80 of the slide bracket 62. It will be apparent that by rotation of the jack screw 72 through a crank arm 82 the mounting plate 54 and grinding head 32 may be raised and lowered relative to the slide bracket 62 and the knives 22. A detent pin 84 mounted on the mounting plate 54 is urged by a spring 86 into engagement with the cog 76. The cog 76 can be calibrated so that each click of this detent gives an indication of the degree to which the grinding stone 36 is lowered and the amount of material that will be removed from a beveled surface b in sharpening a knife. This detent arrangement also prevents inadvertent rotation of the jack screw 72 to maintain the grinding stone in an adjusted position. The pin 84, however, may be pulled away from cog 76 to permit rapid raising or lowering of the assembly.

It will also be seen that a guard 87 encircles the grinding stone 36. This guard is secured to a bracket 89 which in turn is mounted on the slide bracket 62 by screws 91.

Referencing FIGS. 5 and 6, mounting and adjustment of the guide bar 40 will be described in greater detail. The guide bar 40 is formed as a helix having a helix angle matching the knives 22. More specifically, the raceway formed by the beveled edges of the bar 40 match the helix angle of the beveled surface b and the cutting edge c of each knife. As shown in FIGS. 2 and 5, the guide bar has an elevated end 41 and a lower end 43.

The guide bar should be positioned rigidly with respect to the cutter rotor 20, as well as being accurately positioned concentrically thereof. To these ends the lower end of the guide bar 40, adjacent to the upper horizontal surface of the near frame member 28 (see also FIG. 2), is secured to the mounting arm 42 by a screw 88 which passes through the guide bar and is threaded into the arm 42. The arm 42 is mounted by a pin 90 to a frame attached lug 92 and is rigidly secured to the frame member 28 by a screw 94 which is threaded into an integral boss 95 of the arm 42 and clamps this boss against the inner surface of the frame member 28. The opposite end of the guide bar 40 which curves a substantial distance above the horizontal upper surface of the frame members 28 and 30 is secured to the support arm 44 by a screw 96. The lower end of the support arm 44 is also mounted through a pin to a frame-mounted lug similar to pin 90 and lug 92. Bracing and positioning means for the guide bar 40 are provided through a bar 98, the lower end of which is secured to the frame member 30. The support arm 44 is also supported and positioned by an adjusting screw 102 which is threaded through an angle piece 104 projecting from the bar 98.

Figure 7:
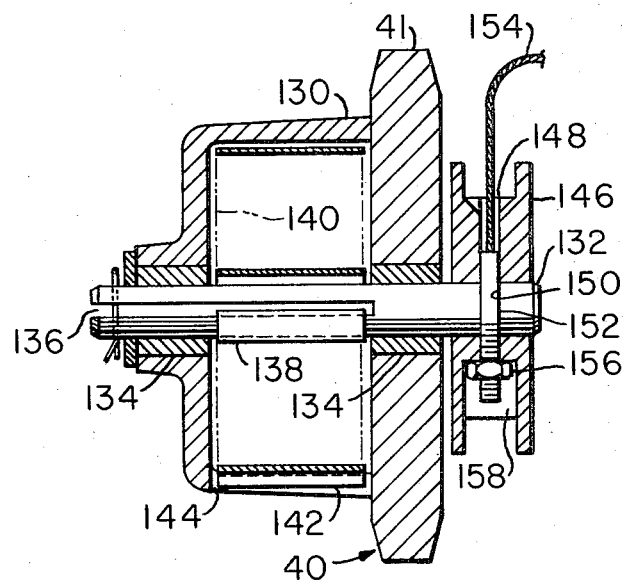
FIG. 7 is a view of a motor spring used to assist movement of the sharpening head.

Referring to FIG. 7 there is shown a motor spring used to assist the movement of the slide along the guide bar 40. The motor spring comprises an outer housing 130 suitably secured to the elevated end 41 of guide bar 40 by screws (not shown). A shaft 132 is journaled in the housing 130 and guide bar 40 by suitable sleeve bearings 134. Shaft 132 has a longitudinal slot 136 which receives a hook 138 on a spiral coiled spring 140 positioned within housing 130. The outer end of spring 140 has a hook 142 received in a slot 144 in housing 130. A pulley 146 telescopes over the end of shaft 132 that extends through the guide bar 40. Pulley 146 and shaft 132 have aligned radial holes 148 and 150, respectively, which receive a sleeve 152 mounting the end of a flexible cable 154. A nut 156 threaded onto the end of sleeve 152 is received in recess 158. Flexible cable 153 is wrapped around pulley 146 and its opposite end is looped around a nut and bolt assembly 160 secured to the slide bracket 62 (see FIG. 4). As will be described later, the spring motor coil spring 140 is wrapped in such a way that it drives the pulley 146 to wind the flexible cable up on pulley 146 and thus pulls the slide bracket 62 up the track to the elevated end 41 of the guide bar 40.

As is seen in FIG. 5, a bolt 162 is threaded through a sleeve 164 and secured to the elevated end 41 of guide bar 40 to form an upper stop for the slide bracket 62. As seen in FIG. 4 particularly, a boss 166 integrally cast with the slide bracket 62, abuts the bolt 162 at the extreme upper end of its travel. A suitable arrangement (not shown) is used to limit the travel at the lower end 43 of the guide bar 40.

In initially installing the bar 40 of the short support arm 42 may be rigidly installed relative to the frame member 28, as above described. The screw 88 may be threaded into place without being tightened. The longer support arm 44 may be mounted on its lower pivotal support and the screw 96 may loosely attach the bar 40 thereto. Also, the screw 100 may be loosely threaded into the support arm 42. The screws 88, 96 and 100 are attached in what can be described as finger tight, that is, they are relatively snug but not in a fully tightened and clamping position. The grinding head 32 may then be traversed across a knife 22 positioned in its sharpening position and the support arm 44 raised or lowered by the adjustment screw 102 so that there is even contact of the grinding stone with the beveled surface b along the length of the knife blade which in turn indicates the desired degree of concentricity. The screws 88, 96 and 100 may then be tightened to secure and rigidly hold the guide bar in its desired position as thus obtained. It will also be noted that the screw 100 passes through an elongated slot 106, in the bracing bar 98, which is provided in the bar 98 to accommodate this adjustment.

Referencing again FIG. 2, the means for locking the several knives 22 in their sharpening position will now be described. As index wheel 108 is secured to the rotor shaft 26. The index wheel has a plurality of equiangularly spaced holes 110 formed therein on a common radius. The holes 110 are equal in number to the number of knives 22 and have a predetermined relationship to the angular position of such knives. A relatively fixed index in the form of an index bracket 112 is secured to the frame member 28 and is provided with an index hole 114. When one of the holes 110 is aligned with the fixed index hole 114, a given knife 22 is properly positioned for the sharpening operation. The rotor may then be locked in this position by insertion of a pin 116 through the aligned holes 110 and 114.

The index bracket 112 is secured to the frame member 28 by screws 118 which pass through bracket slots 120. This enables the index bracket 112 to be angularly adjusted relative to the frame member 28 in order to accurately establish the sharpening position of the knife blades relative to the grinding head 32.

The operation of the present sharpening device is quite simple. After removal of a rotor cover (not shown) which overlies the knives 22, the rotor is angularly locked to bring one of the knives to its sharpening position by inserting the pin 116 through an aligned hole 110 and the index hole 114. It may be necessary to first decouple the shaft 26 from the drive means therefor or means driven therefrom, all of this being readily performed.

Once a knife is thus positioned for sharpening, the grinding wheel which has been connected to an appropriate source of electrical energy through a cord 120 is brought adjacent the far end of the knife and the height of the sharpening head adjusted by turning the jack screw crank arm 82 to remove a desired amount of material from the beveled surface b. The grinding head will then be traversed along the guide bar 40 by gripping a slide handle 122. As the slide bracket 62 is moved down the guide bar 140 it pulls flexible cable 154 to wind up the motor spring 140. The force of gravity assists the operator in pulling the slide bracket 62 down against the force of the spring. As the operator moves the slide bracket 62 up the guide bar, the force of the motor spring 140 assists the operator in counteracting the force of gravity. The spring force is adjusted so that the force required to move the slide bracket up and down the guide bar is approximately equal. The grinding head should be steadily advanced and then returned to the far side of the rotor to a position where the grinding wheel is clear of the knife 22. The pin 116 is then removed, the shaft 26 is rotated to bring the next successive hole 110 into registration with the index hole 114 and without further adjustment. The grinding head is traversed in the same fashion to sharpen the next knife. This process is then repeated until all knives on the rotor have been sharpened. Thereafter, further material may be removed from the beveled surfaces b by lowering the grinding head 32 an incremental amount. Each knife is thus sharpened with the proper angle of the beveled surfaces b and with the cutting edges defined thereby concentric with the axis of the rotor.

After the sharpening procedure is completed, the grinding head is displaced to an extension of the guide bar 40 outwardly of the frame member 30. This is the storage position in which it may be stored by a pin 124 being inserted through a hole 126 (indicated in FIG. 5) in the bar 40. The guide is thus held in ts storage position permitting replacement of the rotor cover and safe storage of the grinding head during normal operation of the forage chopper.

Variations in the preferred embodiment described will occur to those skilled in the art, particularly in the combination of the sharpening device with a forage chopper and in the sharpening device itself, all within the spirit and scope of the present inventive concepts which are to be derived solely from the following claims.

Having thus described the invention, what is claimed as novel and desired to be secured by Letters Patent of the United States is:

1. A forage chopper, or the like, in combination with a sharpening mechanism, said chopper comprising:
   a rotor having a plurality of knives mounted thereon,
       each knife having a cutting edge twisted to a given helix angle concentrically of the axis of the rotor,
       each cutting edge being bounded by an outwardly facing bevel surface, and
   frame means on which the rotor is journaled,
   said sharpening mechanism comprising:
   means for selectively locking said rotor in angular positions relative to said frame means, successively positioning each respective knife in a sharpening position,
   a guide member having a raceway formed at the same helix angle as said cutting edges and concentrically of said rotor axis,
   a sharpening element, and
   means slidable along and guided by said raceway for positioning said sharpening element for engagement with the beveled surface of a knife held in its sharpening position,
   whereby the sharpening element may be translated along the guide member to remove material from the beveled surfaces of the knives to sharpen their cutting edges.

2. A combination as in claim 1 wherein the rotor locking means comprises:
   a fixed reference index on said frame means,
   an index wheel secured to said rotor, said index wheel having a plurality of index surfaces registerable with said fixed index, each of said plurality of index surfaces respectively having a predetermined relationship with one of said knives which, when registered with said fixed index, positions that knife in said sharpening position, and
   means for locking said index wheel relative to said fixed index when any one of the plurality of index surfaces is registered therewith whereby successive knives may be brought to a sharpening position.

3. A combination as in claim 2 wherein:
   the fixed index comprises a bracket having a hole therethrough spaced outwardly from and parallel to the axis of said rotor,
   the index wheel comprises a plurality of equi-angularly spaced holes successively alignable with the fixed index hole,
   the means locking the index wheel relative to the fixed index comprises a pin insertable through a registered index wheel hole and the fixed index hole, and
   means for adjustably securing the fixed index bracket to said frame means through a limited amount of angular movement relative to the rotor axis to provide accurate positioning of the knives in their sharpening positions.

4. A combination as in claim 1 wherein means are provided for adjusting the sharpening element relative to the slidable means in a direction toward and away from the rotor axis.

5. A combination as in claim 1 wherein means are provided for storing said sharpening element in a position clear of and spaced from said knives when said rotor is rotating in normal operation of the forage chopper.

6. A combination as in claim 1 wherein said slidable means includes:
   a bracket mounted on and guided by said helical raceway,
   a mounting plate on which the sharpening element is mounted, and means for adjusting the mounting plate relative to said bracket in a direction towards and away from the rotor axis.

7. A combination as in claim 6 wherein:
said guide member is in the form of a helical bar of generally rectangular cross section with top and bottom surface portions thereof forming said raceway, and
said slide bracket has mounted thereon a plurality of grooved wheels engaged with and positioned by the raceway surfaces of the guide bar.

8. A combination as in claim 7 wherein:
the frame means comprises a pair of laterally spaced frame members on which the opposite ends of said rotor are respectively journaled, the upper surfaces of said frame members being disposed in a generally horizontal plane disposed below the path of revolution of the cutting edges of said knives,
said guide bar is disposed above said frame members with one end thereof spaced adjacent one frame member and the other end curved to a greater distance above the other frame member, and further comprising:
means for supporting said one end of the guide bar from said one frame member through a single pivot point,
means for clamping said one end of the guide bar to the support means therefor,
a support arm pivotally mounted on the other frame member and secured at its outer end to the other end of the guide bar, and
means for securing and bracing said support arm in a pivotally adjustable enabling the raceway surfaces thereof to be accurately disposed concentrically of the rotor axis.

9. A combination as in claim 8 wherein:
the guide bar extends beyond said support arm outwardly of the other frame member whereby the sharpening element may be moved to a storage position spaced from said rotor during normal operation of the forage chopper, and
means for selectively locking said slide bracket to said guide bar in said storage position.

10. A combination as in claim 9 wherein:
the sharpening element comprises a grinding stone and an electric motor having a generally vertically disposed shaft with the grinding stone being mounted on the lower end thereof for engagement of its outer radial face with the bevel surface of a knife locked in its sharpening position,
said motor being secured to said mounting plate and further wherein,
the means for adjusting the mounting plate relative to the bracket of the slidable means comprises a jack screw and,
detent means for sensing the amount of rotation of the jack screw and thus the amount of adjustment of the grinding wheel towards the axis of the rotor to control the amount of material removed from the beveled surfaces during the sharpening operation.

11. A combination as in claim 10 wherein:
the marginal raceway-forming edge portions of the guide bar are beveled and the grooves of said slide bracket wheels are correspondingly tapered,
the grooved wheels mounted on said slide bracket comprise an upper pair of wheels disposed respectively in generally opposed relation to a lower pair of wheels,
one pair of said guide wheels rotate on eccentrics which may be rotated relative to said slide bracket in encircling relation with said grinding stone,
and further wherein:
the rotor locking means comprises a fixed index bracket having a hole therethrough spaced outwardly from and parallel to the axis of the rotor, an index wheel secured to said rotor and having a plurality of equi-angularly spaced holes, each having a predetermined relationship with one of said knives and, when registered with the fixed index hole, positioning that knife in its sharpening position,
a pin insertable through a registered index wheel hole and the fixed index hole to lock the rotor in fixed position, and
means for adjustably securing the fixed index bracket to one of said frame members through a limited amount of angular movement relative to the rotor axis to provide accurate positioning of the knives in their sharpening positions.

12. A sharpening device for in situ sharpening of a knife having a helical cutting edge defined on one side by a sharpenable surface, said knife being mounted on a rotor journaled on a frame means, said device comprising:
means for locking the knife rotor in a fixed sharpening position,
a sharpening element engageable with said cutting edge surface when the knife is in a predetermined fixed position,
means for helically guiding said sharpening element along the length of said sharpenable cutting edge surface and maintaining a constant angular and distance relationship therebetween as the sharpening element is so traversed when the knife is in said fixed position, and
means for mounting the helical guide means on said frame means in predetermined relationship to the knife sharpening position.

13. A sharpening device as in claim 12 wherein means are provided for adjusting the sharpening element relative to the helical guide means in a direction toward and away from the rotor axis.

14. A sharpening device as in claim 13 wherein:
the sharpening element comprises an electrical motor having its shaft disposed generally in a plane normal to the plane of the sharpenable surface of the knife and a grinding stone mounted on the lower end of said motor shaft with its outer radial face of the grinding stone engageable with said sharpenable surface and further wherein the helical guide means comprises:
a helical bar mounted on said frame means, said bar being generally rectangular with opposed surfaces thereof forming a helical raceway,
a slide bracket having a plurality of grooved wheels engaging with and positioned by the raceway surfaces of the guide bar,
a mounting plate to which the motor is secured, and
means for adjusting the mounting plate relative to the guide bracket in a direction generally parallel to the axis of the motor shaft.

15. A combination as in claim 1 wherein said guide member is formed to have one end lower than the opposite end and wherein said combination further comprises means positioned at the upper end of said guide means for yieldably urging said slidable means toward said opposite end.

16. A combination as in claim 15 wherein said yieldable urging means comprises a spiral coiled spring connected at one end to a shaft and the other end fixed relative to said guide member and a pulley connected to said shaft and having a line wrapped around said pulley and extending to said slidable means, said helical spring urging said pulley in a direction to wrap the line therearound and urge said slidable means toward said opposite end.

* * * * *